US011034069B2

(12) United States Patent
Stagon et al.

(10) Patent No.: US 11,034,069 B2
(45) Date of Patent: Jun. 15, 2021

(54) 3D PRINTED INJECTION MOLD TOOL WITH IMPROVED HEAT TRANSFER AND MECHANICAL STRENGTH

(71) Applicants: Stephen P. Stagon, Jacksonville, FL (US); Tuan Tran, Jacksonville, FL (US)

(72) Inventors: Stephen P. Stagon, Jacksonville, FL (US); Tuan Tran, Jacksonville, FL (US)

(73) Assignee: University of North Florida Board of Trustees, Jacksonville, FL (US)

( * ) Notice: Subject to any disclaimer, the term of this patent is extended or adjusted under 35 U.S.C. 154(b) by 67 days.

(21) Appl. No.: 16/406,691

(22) Filed: May 8, 2019

(65) Prior Publication Data

US 2019/0263039 A1 Aug. 29, 2019

Related U.S. Application Data

(63) Continuation-in-part of application No. 15/896,795, filed on Feb. 14, 2018, now Pat. No. 10,828,816.

(60) Provisional application No. 62/458,872, filed on Feb. 14, 2017.

(51) Int. Cl.

| | |
|---|---|
| ***B29C 45/73*** | (2006.01) |
| ***B29C 45/26*** | (2006.01) |
| ***B29C 33/38*** | (2006.01) |
| ***B33Y 80/00*** | (2015.01) |

(52) U.S. Cl.
CPC ...... *B29C 45/7312* (2013.01); *B29C 33/3842* (2013.01); *B29C 45/26* (2013.01); *B33Y 80/00* (2014.12)

(58) Field of Classification Search
CPC ..... B29C 45/7312; B29C 45/26; B29C 45/73; B29C 33/3842; B29C 33/40; B29C 33/60; B29C 33/56; B33Y 80/00; B33Y 10/00
See application file for complete search history.

(56) References Cited

U.S. PATENT DOCUMENTS 5,358,211 A * 10/1994 Sterett .................... B29C 33/02 249/80
2006/0165973 A1 * 7/2006 Dumm .................... C23C 28/00 428/323

* cited by examiner

*Primary Examiner* — Joseph S Del Sole
*Assistant Examiner* — Jamel M Nelson
(74) *Attorney, Agent, or Firm* — Smith & Hopen, P.A.; Paul Murty

(57) ABSTRACT

A problem exists of prohibitively high costs associated with molds for small run, legacy, or prototype injection molded parts. Further, the lead time on molds is currently on the order of about two weeks. A mold is provided that is formed from three-dimensional printing. The mold includes a series of air and/or water cooling channels to limit thermal stresses to the mold. Additionally, a series of coatings is added to the surface of a 3D printed mold to extend the lifetime of the mold and increase the performance of the mold. The coatings perform a function other than to define a shape of an injection cavity, such as improving thermal conductivity, providing a thermal barrier between the injection material and the mold body, or improving the detachment of the final mold product from the mold body.

9 Claims, 10 Drawing Sheets

1 7 6 1a 3 2 1b 5

3D PRINTED INJECTION MOLD TOOL WITH IMPROVED HEAT TRANSFER AND MECHANICAL STRENGTH

CROSS-REFERENCE TO RELATED APPLICATIONS

This nonprovisional application is a continuation-in-part of and claims priority to nonprovisional application Ser. No. 15/896,795, entitled "3D printed injection mold coating to extend lifetime and performance," filed on Feb. 14, 2018, issued as U.S. Pat. No. 10,828,816 on Nov. 10, 2020, by the same inventors, which claims priority to provisional application No. 62/458,872, entitled "3D printed injection mold coating to extend lifetime and performance", filed on Feb. 14, 2017, by the same inventors.

FIELD OF THE INVENTION

This invention relates, generally, to tooling equipment. More specifically, it relates to injection molds and molds formed from three-dimensional printing that exhibit extended lifetimes and enhanced performance, due to the coatings and/or the housings used in combination with the molds.

BACKGROUND OF THE INVENTION

Almost all consumer products made from plastic are formed through injection molding.

Typically, mold tools are made from steel or aluminum through subtractive manufacturing techniques. These mold tools last for 100,000+ parts, but often require 15+ days for even the most rapid design and are prohibitively expensive for small batch manufacturing or prototyping.

Injection molding is commonly used for high-volume manufacturing of parts made of meltable material, most commonly of parts made of thermoplastic polymers. During a repetitive injection molding process, a plastic resin, most often in the form of small beads or pellets, is introduced to an injection molding machine that melts the resin beads under heat, pressure, and shear. The molten resin is injected into a mold cavity having a particular cavity shape. The resin is injected via hydraulic injection or motor-driven injection into a mold. The injection requires very high pressures, which require high clamping forces to hold the mold closed during filling, and sturdy molds to withstand the pressures, typically made from hardened tool steels. The clamping forces and mold structure result in very expensive molding equipment. The high pressures also require very high strength injection molds.

The mold itself may have a single cavity or multiple cavities. Each cavity may be connected to a flow channel by a gate, which directs the flow of the molten resin into the cavity. It is common for large parts to have two, three, or more gates to reduce the flow distance the polymer must travel to fill the molded part. The injected plastic is held under pressure in the mold cavity, and the plastic begins to solidify starting at the interface between the plastic and mold surface. Once cooled, the plastic part is removed as a solidified part having a shape that is complementary to the cavity shape of the mold.

Several companies offer 3d printed polymeric molds for much lower prices and 1 day turnaround times, but these molds only last for a maximum of 100 parts. If the life of these molds can be extended to ~1000 parts, these molds will become viable as a gap-stop for rapid need production, small batch high profit parts, and rapid prototyping runs.

Existing three-dimensional printed molds fail because of the high temperatures and pressures that the molds are exposed to during injection. The failure of the mold is typically through softening, thermal warpage, or hot tearing of the mold material. Although there is often conformal water cooling in large channels in the interior of these molds, the thermal conductivity of the polymer is prohibitively low and the front of the mold cannot sufficiently exhaust heat.

Accordingly, what is needed is a modified mold having an improved life cycle. In particular, what is needed is a modified mold including one or more coatings within the mold, and/or one or more fluidic channels from the mold to the exterior environment, thereby insulating the mold from extreme temperatures. Also needed is an efficient method of manufacturing 3D printed injection mold tools with improved heat transfer and mechanical strengths. However, in view of the art considered as a whole at the time the present invention was made, it was not obvious to those of ordinary skill in the field of this invention how the shortcomings of the prior art could be overcome.

BRIEF SUMMARY OF THE INVENTION

The long-standing but heretofore unfulfilled need for an inexpensive injection mold having increased lifespan, heat transfer capabilities, and mechanical strength, is now met by a new, useful, and nonobvious invention.

The novel structure includes a mold body having an exterior wall and an interior wall, with the interior wall defining a cavity. An injection channel is in communication with the cavity and the exterior wall of the mold body. The injection channel is adapted to create a pathway for a molding material to be injected into the cavity. A cooling channel is disposed between the exterior and interior walk of the mold bold. The cooling channel is in fluidic communication with the cavity and an environment exterior to the exterior wall. The cooling channel is thereby configured to improve the thermal conductivity of the mold body by transferring heat energy from the mold body to the environment exterior to the exterior wall. The interior wall of the mold body includes at least one coating disposed thereon, with the at least one coating being configured to improve the thermal conductivity of the mold body.

In an embodiment, the mold body includes a first portion and a second portion, with each portion including an exterior wall and an interior wall, with the interior walls of the portions being adapted to rest against each other.

In an embodiment, the mold body is encased within a housing, with the injection channel being disposed within the housing and in communication with the cavity defined by the mold body. The cooling channel is disposed within the housing, and is in fluidic communication with the mold body.

An embodiment of the novel structure includes a mold body including a first longitudinal surface spanning between a first lateral surface opposite a second lateral surface, with an interior side of the first longitudinal surface, first lateral surface, and second lateral surface defining an interior shell. An injection cavity is defined by an exterior side of the first longitudinal surface. A thermally conductive cooling channel is at least partially disposed within the interior shell and is in communication with an environment exterior to the mold body, such that the cooling channel is adapted to remove heat energy from the mold body to the environment exterior to the mold body. The cooling channel is disposed to receive a cooling fluid, with the cooling fluid being configured to interact with the mold body to improve thermal conductivity of the mold body by removing heat energy from the mold body. A metallic layer is disposed within the interior shell, such that the metallic layer surrounds the cooling channel and forms a second longitudinal surface opposite the first longitudinal surface. The metallic layer is adapted to conform to a shape of the interior shell in a liquid form and solidify between the first longitudinal surface, first lateral surface, and second lateral surface.

A metallic coating may be disposed on the exterior side of the first longitudinal surface. In a further embodiment, the metallic coating is disposed on the exterior side of the first longitudinal surface, an exterior side of the first lateral surface, and an exterior side of the second lateral surface. The metallic coating has a thickness of between 200 and 1,000 microns, such that the metallic coating is adapted to be self-supporting under gravity.

In an embodiment, the mold body is formed of a polymeric material, and the metallic layer disposed within the interior shell is formed of a metal having a low melting temperature selected from the group consisting of indium, tin, gallium, zinc, alloys copper, alloys of silver, alloys of gold, and combinations thereof. In an alternative embodiment, the mold body is formed of a metallic material, wherein the metallic layer disposed within the interior shell is formed of a metal having a high melting temperature selected from the group consisting of aluminum, copper, iron, steel, and combinations thereof.

A method of creating a mold in accordance with an embodiment of the present invention includes a step of providing a shell, with the shell at least partially defining a mold body having a first longitudinal surface spanning between a first lateral surface opposite a second lateral surface. A thermally conductive cooling channel is disposed within the mold body, with the cooling channel spanning a longitudinal length of the shell from the first lateral surface to the second lateral surface. An exterior portion of the shell is coated with a metallic coating. The coating step may be performed via electroless plating to produce an even and conformal metallic coating. The shell is filled with a liquid metallic layer, such that the liquid metallic layer conforms to a shape of the shell between the first longitudinal surface, first lateral surface, and second lateral surface. The liquid metallic layer is solidified around the cooling channel and within the shell to create a solid metallic mold body that is adapted to be used to create molded objects. After the liquid metal layer solidifies, the method includes a step of forming a second longitudinal surface opposite the first longitudinal surface, the second longitudinal surface being formed from the solidified metallic layer.

In an embodiment, the shell is made of a polymeric material. In this embodiment, after the step of coating the exterior portion of the shell with the metallic coating, the method further comprises a step of removing the polymeric material from the mold body by heating the mold body, such that the metallic coating becomes the shell of the mold body.

If the mold body includes an injection cavity disposed on an exterior surface of the mold body, the method includes a step of coating the injection cavity with the metallic coating. In this embodiment, the method may further include a step of creating a molded object by disposing an injection mold material with the coated injection cavity.

An object of the invention is to provide a cooling channel and a coating that improve the thermal conductivity of the mold body, thereby increasing the lifespan of the mold body, allowing more injection molds to be created through the mold body in an efficient way.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

Figure 1:
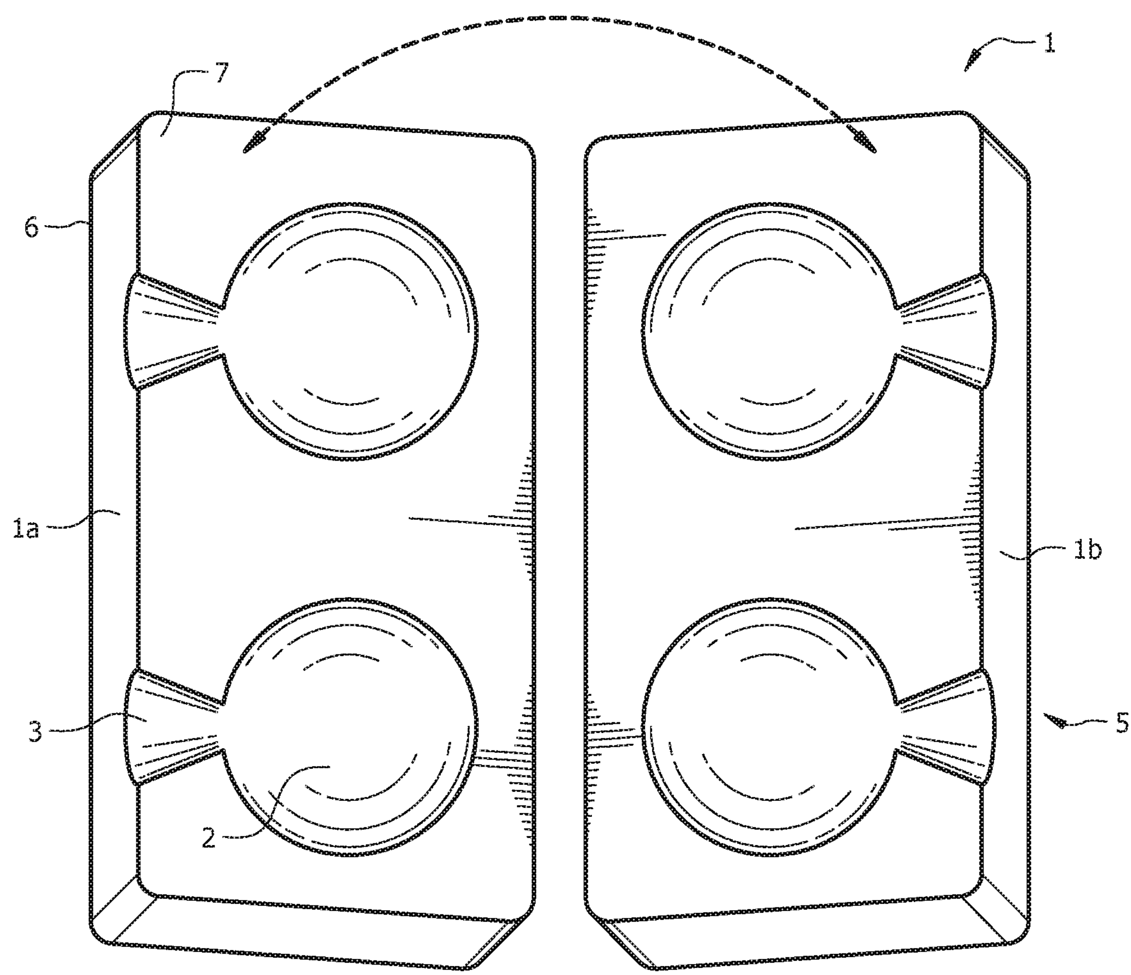
FIG. 1 is perspective view of a mold.

As shown in FIG. 1, mold 1 is formed of mold subparts 1_a_ and 1_b_. Mold 1 includes injection cavity 2 and injection channel 3. While the drawings depict a single injection channel, it is known in the art that multiple injection channels can be used to facilitate more rapid material injection into mold 1, as discussed above. Mold 1 includes mold body 5, which includes exterior wall 6 and interior wall 7. Interior wall 7 defines injection cavity 2, as seen in FIG. 1. For one or more of mold subparts 1*a*, 1*b*, injection channel 3 is in communication with injection cavity 2 and exterior wall 6. Accordingly, injection channel 3 is adapted to create a pathway for a molding material to be injected into cavity 2. When the molding material is injected into cavity 2, mold body 5 can form an injection mold of a particular set of dimensions.

Mold body 5 is formed of a three-dimensional-compatible material. Non-limiting examples include thermoplastic polyurethane, polyethylene terephthalate, polyamide-imide, nylon, polyvinyl chloride, polycarbonate, polyphthalamide, polysulfone, maleimide/bismaleimide, polyetheretherketone, polyetherimide, polyimide, polyester, acrylonitrile butadiene styrene, carbon reinforced-polyimide, carbon reinforced-polyethylene terephthalate, carbon reinforced-polyamide-imide, carbon reinforced-nylon, carbon reinforced-polyvinyl chloride, carbon reinforced-polycarbonate, carbon reinforced-polyphthalamide, carbon reinforced-polysulfone, carbon reinforced-maleimide/bismaleimide, carbon reinforced-polyetheretherketone, carbon reinforced-polyetherimide, carbon reinforced-polyimide, carbon reinforced-polyester, carbon reinforced-acrylonitrile butadiene styrene, glass reinforced-polyimide, glass reinforced-polyethylene terephthalate, glass reinforced-polyamide-imide, glass reinforced-nylon, glass reinforced-polyvinyl chloride, glass reinforced-polycarbonate, glass reinforced-polyphthalamide, glass reinforced-polysulfone, glass reinforced-maleimide/bismaleimide, glass reinforced-polyetheretherketone, glass reinforced-polyetherimide, glass reinforced-polyimide, glass reinforced-polyester, glass reinforced-acrylonitrile butadiene styrene, and PLL for fuse deposition modeling. In addition to the above, polyamide-aluminum composite, polyamide-carbon reinforced composite, polyimide, polyimide-glass composite, thermoplastic polyurethane, nylon-glass composite, nylon Ex, nylon HST, nylon-carbon fiber composite, polystyrene, steel, titanium, aluminum, metal alloys, green sand, glass, and ceramic can be used for laser sintering 3-dimensional printing, such as SLS printing. Styrene plastics, vinyl ether plastics, N-vinyl carbazoles, lactones, lactams, cyclic ethers, cyclic acetals, cyclic siloxanes, epoxy and other epoxide compounds, urethanes, polyesters, polyesters and other photopolymers, epoxy and other stereolithography polymers may be used for stereolithography printing or jet printing, including multijet or polyjet printing. Sandstone and compositions thereof are useful in binderjet printing.

Figure 2:
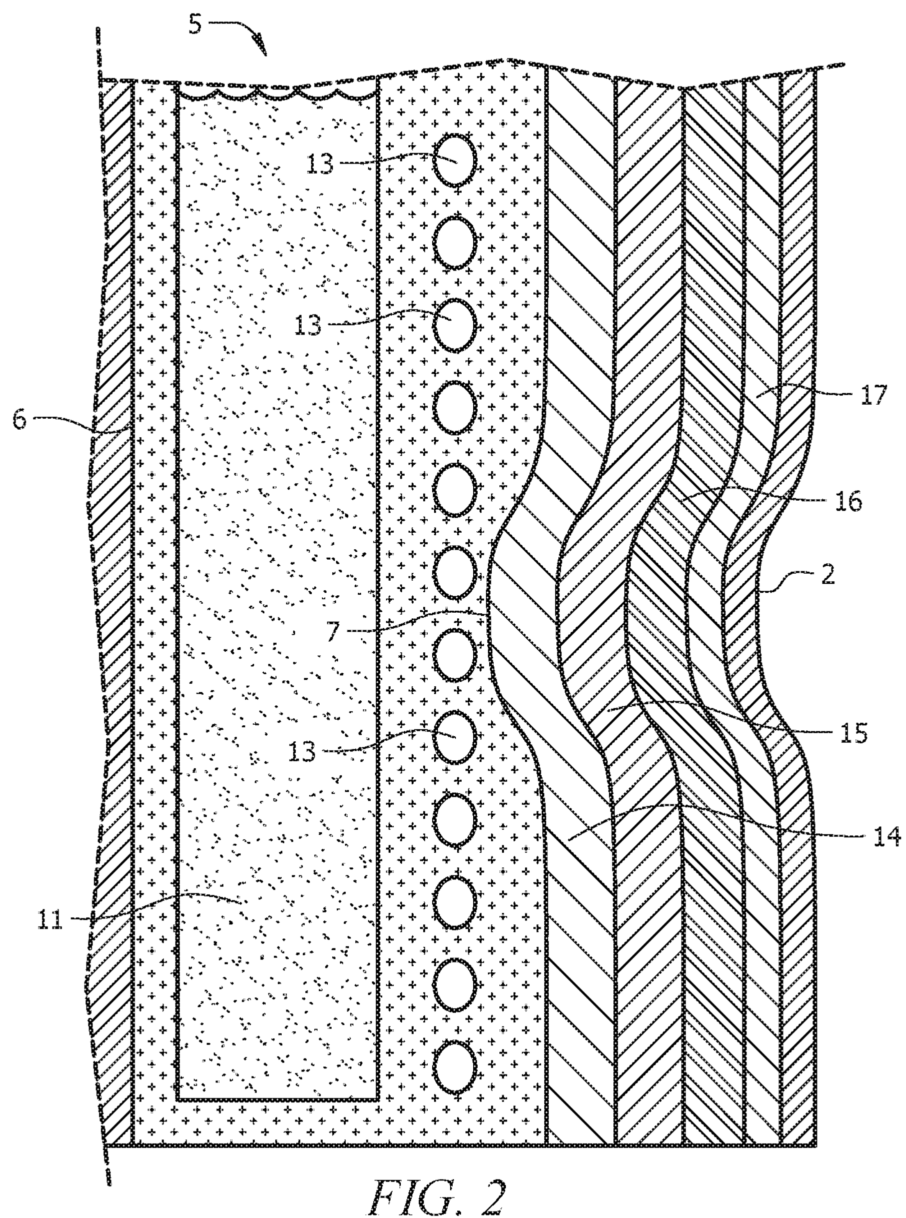
FIG. 2 is a cross-sectional view of a mold including coatings and cooling channels.
Figure 3:
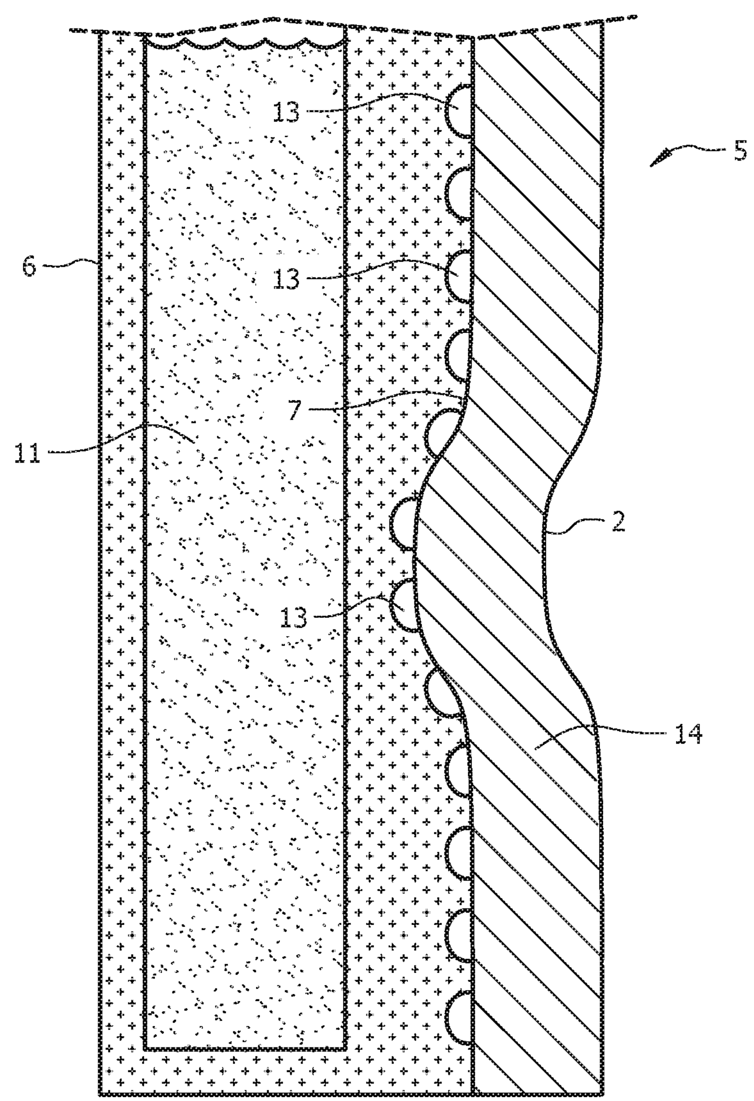
FIG. 3 is a cross-sectional view of a mold including a coating and cooling channels.
Figure 4:
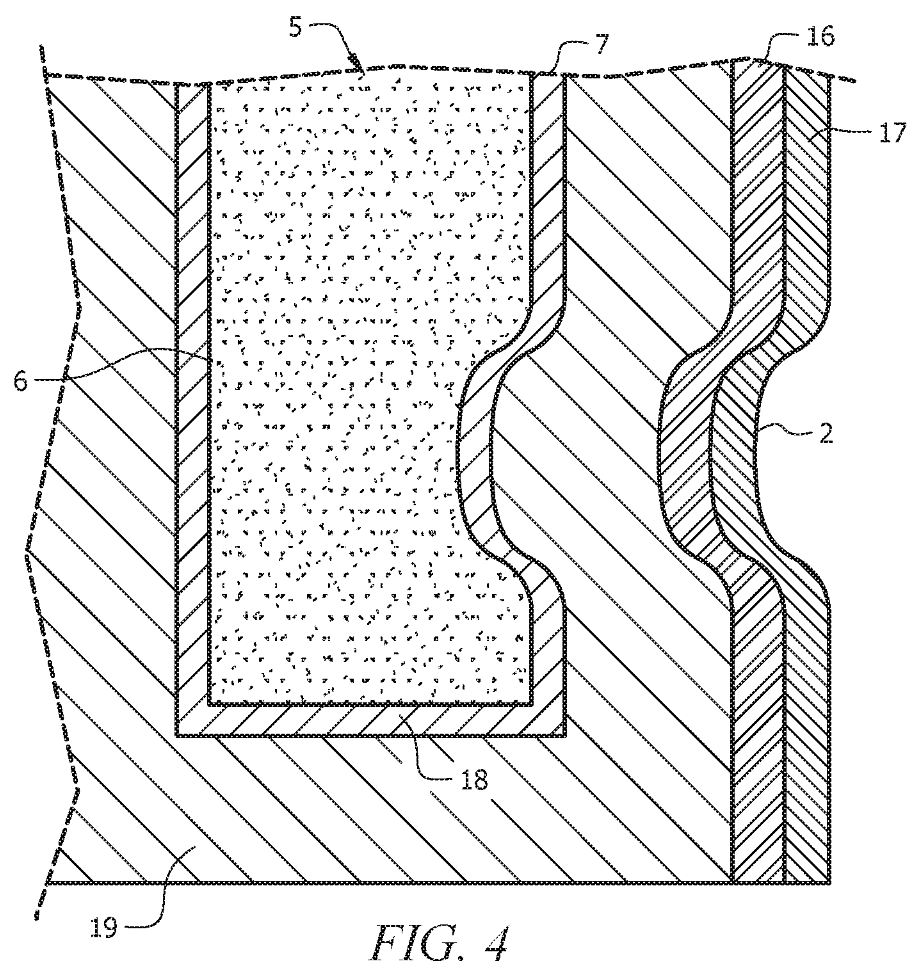
FIG. 4 is a cross-sectional view of a mold including a mold body surrounding by coatings.

Referring now to FIGS. 2-4, mold body 5 is not a solid structure. For example, conformal water channel 11 is disposed adjacent to exterior wall 6, with conformal water channel 11 being disposed between exterior wall 6 and interior wall 7. Conformal water channel 11 provides a fluidic channel formed within mold body 5, with conformal water channel 11 adapted to house water. As such, conformal water channel 11 helps improve the thermal conductivity of mold body 5 by absorbing heat from mold body 5 generated during the injection mold process.

Similarly, conformal air micro channels 13 are formed within mold body 5 during three-dimensional printing of mold body 5. Conformal air micro channels 13 are in communication with the environment exterior to exterior wall 6. Similar to conformal water channel 11, conformal air micro channels 13 are adapted to transfer heat energy from mold body 5 to the environment exterior to exterior wall 6. Accordingly, both conformal water channel 11 and conformal air micro channels 13 may be referred to as cooling channels, with water and air being referred to as cooling fluids. Conformal air micro channels 13 are similar to those in jet turbine engines, placed near the surface of the mold. Examples of microflow channels are noted in JP-A-10-231704, JP-A-2010-65634, and JP-A-2005-350341. In engine turbine microflow channels, the small channel or pores from a porous material are used to direct fluid flow through a material and thereby reduce temperatures in the material. Advantageously, three-dimensional printing permits manufacture of complex shapes, including cavities, that are limited by the resolution of the printer and mold material. Because the pressures inside these microfluid channels are kept high, the mechanical integrity of the area is maintained during injection molding. The high-pressure flow also locally cools close to the surface.

Still referring to FIGS. 2-4, mold body 5 includes a plurality of coatings designed for a variety of purposes, such as allowing a printed mold to be easily removed from mold body 5, or transferring heat energy from mold body 5 to the exterior environment. Specifically, the plurality of coatings are disposed on interior wall 7, such that injection cavity 2 becomes coated with the plurality of coatings. One example of a coating is binding layer 14. Binding layer 14 is disposed on interior wall 7, and may be a material such as tantalum, titanium, chromium, or other refractory metal. In some variations, binding layer 14 is PVD coated. Binding layer 14 has a high melting point, allowing binding layer 14 to withstand high temperatures during the injection mold process. Binding layer 14 is adapted to adhere mold body 5 to other coatings disposed adjacent to binding layer 14. Another example of a coating is strain tolerant layer 15, which is a layer of soft, ductile metal. Strain tolerant layer 15 accommodates for thermal strain mismatch and thermal expansion. Examples of materials of strain tolerant layer 15 are copper, silver, indium, tin, or a similar alloy. Similar to binding layer 14, strain tolerant layer 15 is thermally conductive. Each of binding layer 14 and strain tolerant layer 15 are adapted to remove heat from interior wall 7 of mold body 5, and transfer heat energy to conformal air micro channels 13 and conformal water channel 11. Binding layer 14 and strain tolerant layer 15 may be referred to as thermally conductive layers, which absorb heat energy during the injection mold formation process, thereby largely insulating mold body 5 from being subjected to the heat energy.

A rapid vapor deposition coating is optionally added, to act as a thermal barrier coating to the surface. For example, e-beam or sputtering can be used to deposit a simple thick layer of low cost oxide material, aluminum oxide or silicon dioxide, that provides a very high thermal resistance. This layer can be deposited at an oblique angle to make it somewhat porous, to trap air gaps and increase thermal resistance. To get this layer to stick, surface treatment of the polymer part is undertaken, such as plasma etching immediately before deposition. Some surface roughness can be added by a rapid pumice scrub or through minor bead blasting.

Another coating is porous ceramic thermal resistance layer 16, which may be disposed on strain tolerant layer 15. Porous ceramic thermal resistance layer 16 is optionally alumina or YZr. Both thermal resistance layer 16, as well as the optional rapid vapor deposition coating, have low thermal conductivity. As such, these layers are adapted to prevent heat energy from entering mold body 5 through interior wall 7. Invariably, during the injection mold process, some heat will enter mold body 5, despite the low thermal conductivity of thermal resistance layer 16. The other thermally conductive coatings disposed on mold body 5 are adapted to transfer the heat that enters mold body 5 to conformal air micro channels 13 and conformal water channel 11, as discussed above.

Mold body 5 includes mold release layer 17, which forms an outermost layer disposed on mold body 5. Mold release layer 17 is formed of a hard material to prevent deformation of mold body 5. Mold release layer 17 has high lubricity to allow a mold formed via injection molding to be easily removed from mold body 5. Nonlimiting examples of the material of mold release layer 17 are nickel, chromium, nickel boride, nickel Teflon, or titanium nitride. An injection mold material is injected into mold release layer 17, filling injection cavity 2, thereby allowing the injection mold material to be formed on mold release layer 17. This allows a finished mold to be easily removed from injection cavity 2 after being formed and cooling. In some variations, bond coating 14, strain tolerant layer 15, porous ceramic thermal resistance layer 16, and mold release layer 17 are deposited on mold body 5 via PVD, electrodeposition, electroless deposition, plasma spray, reactive spray.

Referring particularly to FIG. 4, a cross-section of the coatings disposed on mold body 5 are shown in detail. In FIG. 4, mold body 5 is surrounded by a plurality of coatings. Mold release layer 17 forms an outermost coating disposed on mold body 5, such that mold release layer 17 is in communication with an injected material during the injection mold process. Mold release layer 17, as discussed above, helps to easily disconnect an injection mold from mold body 5 after the injection mold formation process is complete. The injection mold is formed within injection cavity 2, which is disposed such that the injection mold is formed against mold release layer 17. Thermal resistance layer 16 is disposed adjacent to mold release layer 17 and acts as a thermal barrier to prevent some heat energy from entering mold body 5. Heat energy that enters mold body 5 through thermal resistance layer 16 first encounters nickel/nickel phosphide layer 19. Nickel/nickel phosphide layer 19 adds strength to mold body 5, thereby preventing strain, warping, and other forms of degradation. Nickel/nickel phosphide layer 19 is coupled to mold body 5 via adhesion layer 18, which helps keep nickel/nickel phosphide layer 19 attached to mold body 5. Both nickel/nickel phosphide layer 19 and adhesion layer 18 help absorb the heat energy that passes through thermal resistance layer 16. Since nickel/nickel phosphide layer 19 and adhesion layer 18 are both thermally conductive, the layers transfer the absorbed heat energy to cooling channels 11 or 13 (not shown in FIG. 5), which can then remove the heat energy from mold body 5.

In the case of a very high-pressure injection, some of these metal layers can be added to high thicknesses, up to 100 microns or more, to increase the strength of the face of the mold. This acts as an exoskeleton for the mold face, which can then withstand very high pressures. Conformal cooling channels can be placed right at the surface of the mold in this case, and filled with dissolvable or meltable support. After the thick metal layer is added, these cooling channels can be emptied and there will be local cooling directly below the surface.

Figure 5:
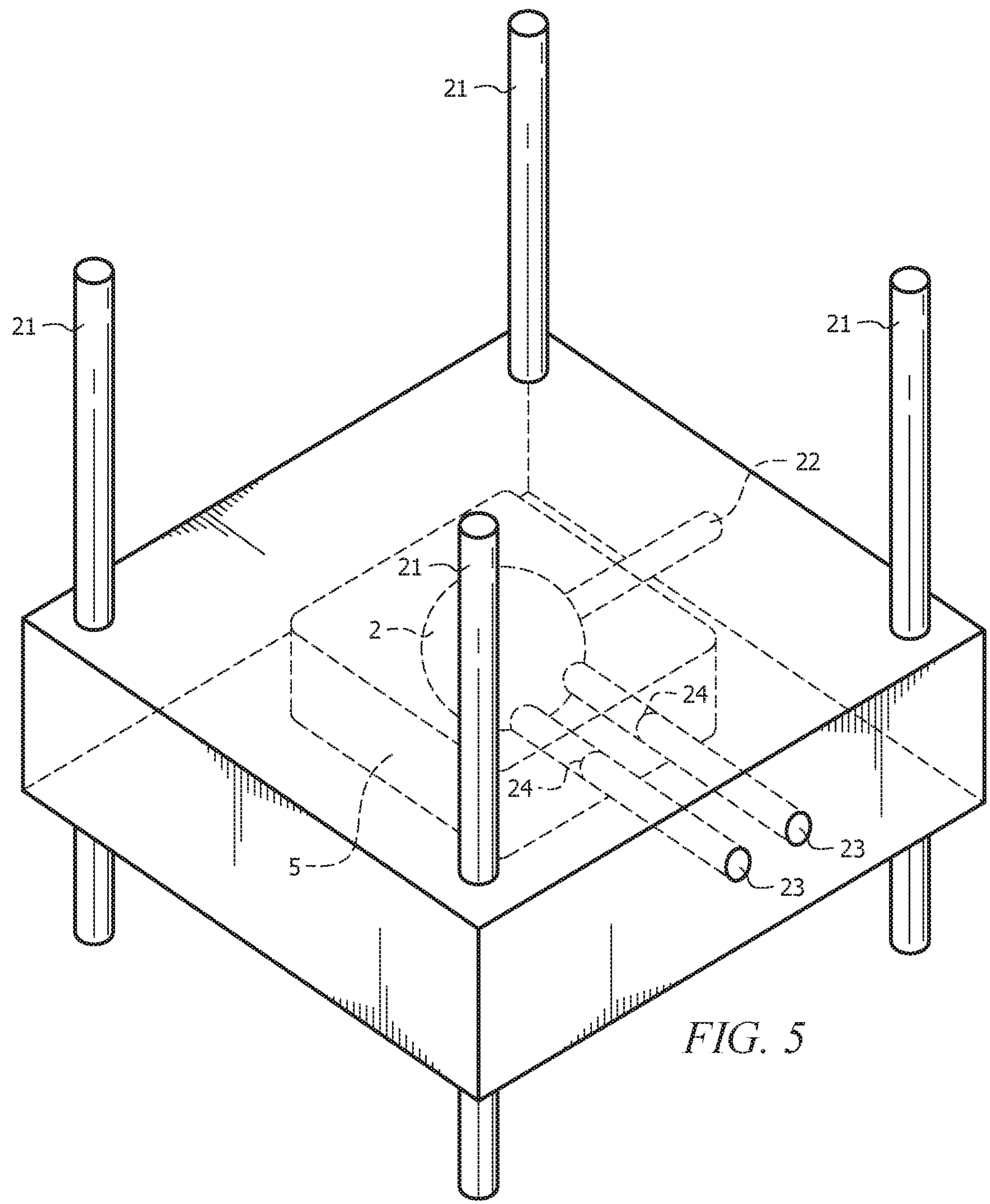
FIG. 5 is a perspective view of a mold encased within a housing.

Referring now to FIG. 5, mold body 5 may be formed within housing 20. Housing 20 is formed of a metal material to further increase the thermal conductivity of mold body 5. Housing 20 includes through-bores that allow housing 20 to be disposed on rails 21. Accordingly, multiple housings can be disposed on a set of rails, with the housings being spaced apart, allowing multiple molds to be formed on the set of rails.

Housing 20 includes injection channel 22 that is in communication with mold body 5, allowing injection mold material to be transferred into mold body 5. Housing 20 also includes cooling channel 23 disposed therein, with cooling channel 23 being in communication with mold body 5. As such, cooling channel 23 provides a fluidic channel wherein heat energy can be removed from mold body 5 and exhausted into the environment exterior to housing 20. The connection between cooling channel 23 and mold body 5 includes flow gate 24, which is adapted to control the flow of cooling fluid between mold body 5 and the environment exterior to housing 20. For example, if the temperature of mold body 5 becomes too hot, flow gate 24 may be opened to allow more fluid to interact with mold body 5. If the temperature of mold body 5 is below a threshold temperature, flow gate 24 may be closed.

Figure 6:
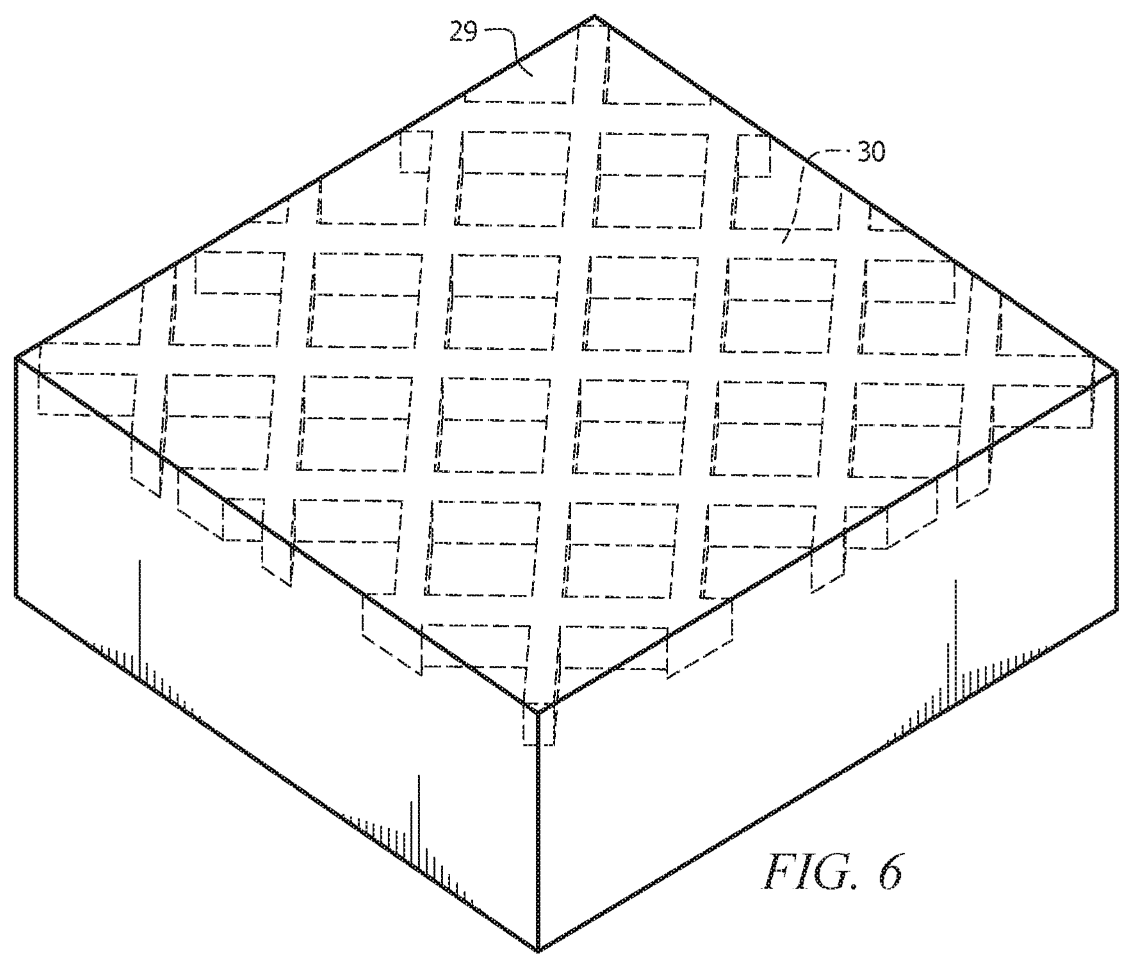
FIG. 6 is perspective view of a housing that encases a mold.
Figure 7:
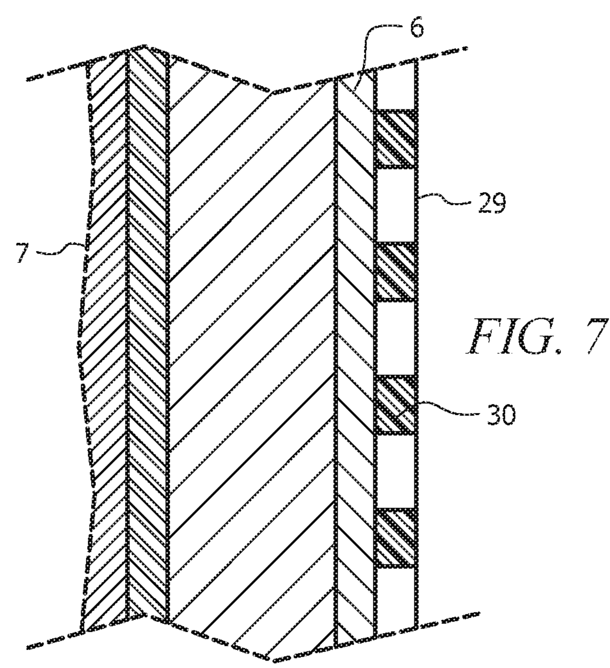
FIG. 7 is a cross-sectional view of a housing that encases a mold.

FIGS. 6-7 show an embodiment of housing 20 including ribs 30. Ribs 30 are disposed within housing 20 and spaced apart from mold body 5, which is not shown in FIGS. 6-7. Ribs 30 further increase the strength of housing 20, and further increase thermal conductivity by absorbing heat energy generated within mold body 5 during the injection mold process. Ribs 30 also increase the stiffness of housing 20, thereby prevent warping. As shown in FIG. 7, ribs 30 extend in a direction away from an exterior surface of housing 20 and toward mold body 5. For example, each rib 30 may be about 100 microns deep and about 1 mm wide, but can be as small as about 100 microns wide.

FIGS. 8-13 depict an alternative embodiments of mold body 5. Polymeric materials can have high degrees of thermal resistivity, which may be advantageous on prolonging the life of a mold body made of polymeric materials, but can increase cycle times of mold body 5 between manufacturing tasks. For example, the solidification and cooling of a liquid injected into mold body 5 to form an injection molded object takes approximately 60 times as long for mold body 5 made of polyether-ether-ketone (PEEK) than for mold body 5 made of aluminum or a comparable metal. It is advantageous to decrease the thermal resistance of mold body 5 to decrease the cooling and cycle times of mold body 5, such as by including metallic components in an interior portion of mold body 5, and/or by eliminating polymeric components within mold body 5.

One such method of accomplishing the goals outlined above is to supercool mold body 5 to a temperature less than a typical room temperature (i.e., between 20° C. and 25° C.). The supercooling of mold body 5 can be accomplished by subjecting mold body 5 to cooling fluid via a cooling channel (discussed in greater detail below), with the cooling being, for example, liquid nitrogen, helium, water, antifreeze, or combinations thereof with a temperature of less than approximately 20° C. Condensation that may occur on the cooling channel or elsewhere in mold body 5 can be mechanically removed or thermodynamically removed via rapid steam of compressed air or gas. By supercooling mold body 5, the cycle time of a polymeric mold body 5 can be greatly reduced compared to a non-cooled mold body 5.

Figure 8:
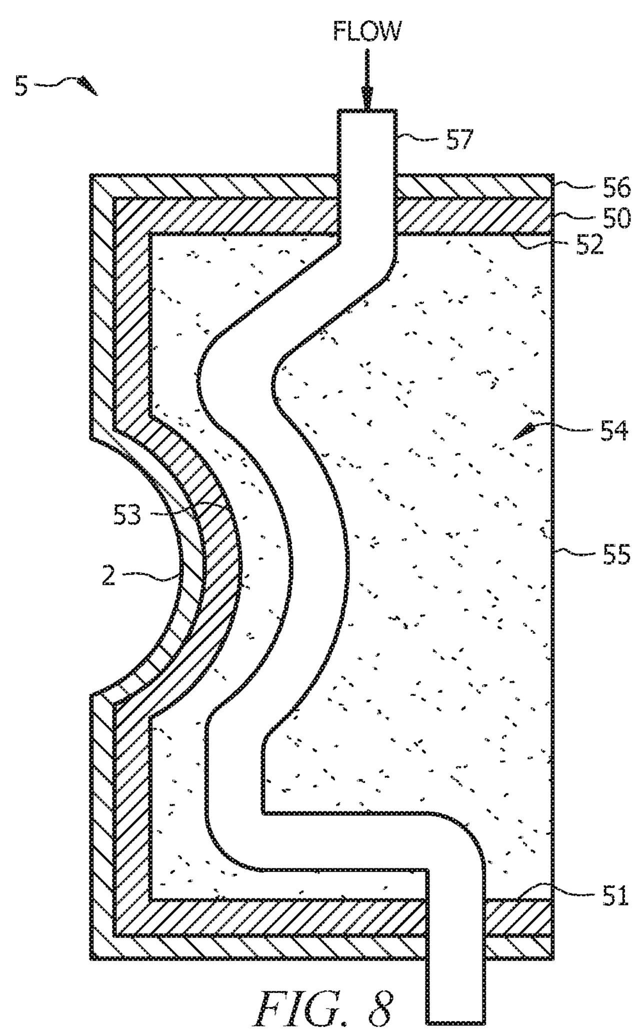
FIG. 8 is a cross-sectional view of a mold including coatings and a cooling channel, in accordance with an embodiment of the present invention.

FIG. 8 in particular depicts an example of mold body 5 in accordance with the embodiments generally discussed above. As shown in FIG. 8, mold body 5 includes injection cavity 2 formed within an exterior surface of mold body 5, with injection cavity 2 adapted to receive injection mold material to form a molded object from mold body 5. In various embodiments, injection cavity 2 can be coated in the coatings discussed in greater detail above, such as binding layer 14, strain tolerant layer 15, porous ceramic thermal resistance layer 16, mold release layer 17, adhesion layer 18, nickel/nickel phosphide layer 19, and combinations thereof.

In FIG. 8, mold body 5 includes polymeric shell 50, which may be 3D printed. Polymeric shell 50 includes first lateral interior surface 51 opposite second lateral interior surface 52, as well as first longitudinal interior surface 53, in accordance with the lateral axis of polymeric shell 50 (i.e., spanning from injection cavity 2 toward an interior of the shell) and the longitudinal axis of polymeric shell 50 (spanning between opposing ends of cooling channel 57, discussed in greater detail below). As such, polymeric shell 50 is open on an end opposite first longitudinal interior surface 53, such that polymeric shell 50 can receive a material disposed therein. As noted above, mold body 5 also includes cooling channel 57 spanning, in part, between first lateral interior surface 51 and second lateral interior surface 52, with cooling channel 57 being in communication with an environment exterior to mold body 5. Cooling channel 57 may be 31) printed within mold body 5, or may be added via metallic tubing or piping to mold body 5. A purpose for cooling channel 57 is to circulate cooling fluid through mold body 5 to cool mold body 5, thereby reducing the downtime between printing tasks, allowing mold body 5 to create molded objects as a faster, more efficient rate.

Polymeric shell 50 of mold body 5 is coated with metallic coating 56, which can also coat injection cavity 2. By including metallic coating 56 on an exterior portion of mold body 5, as opposed to polymeric shell 50, the polymeric material is at least partially insulated from the heat exposure required to create a molded object within injection cavity 2. As such, polymeric shell 50 has a lower temperature during use of mold body 5 than a similar polymeric shell that is not coated with a metallic coating, thereby reducing the cooling time of polymeric shell 50 and mold body 5.

As shown in FIG. 8, polymeric shell 50 of moldy body 5 receives metallic layer 54 disposed therein. In an embodiment, metallic layer 54 is poured into polymeric shell 50 in a liquid form, such that metallic layer 54 conforms to the shape of polymeric shell 50 to solidify therein. After solidifying, metallic layer 54 forms second longitudinal surface 55 opposite first longitudinal interior surface 53. Metallic layer 54 is preferably formed of one or more metals having low melting temperatures, such as indium, tin, gallium, zinc, or alloys thereof, alone or in combination with copper, silver, gold, and other similar metals with low melting temperatures.

Figure 9A:
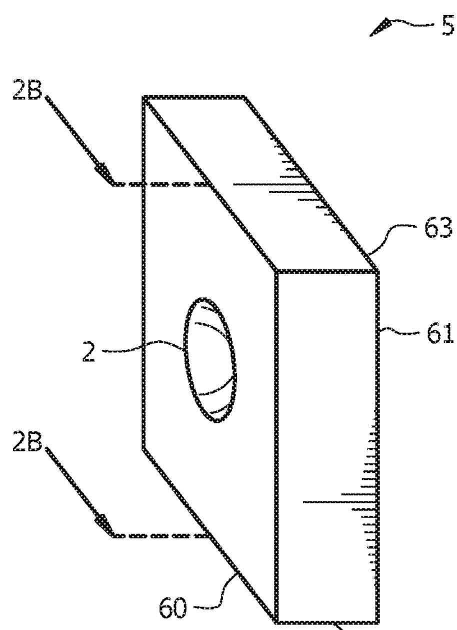
FIG. 9A is an isometric view of an uncoated mold including a cavity disposed therein.

FIGS. 9A-13 depict various stages of creating a mold, as well as a created mold, in accordance with an embodiment of the present invention. FIG. 9A depicts an isometric view of mold body 5 including first longitudinal surface 60 opposite second longitudinal surface 61, and first lateral surface 62 opposite second lateral surface 63. The longitudinal surfaces 60, 61, and the lateral surfaces 62, 63, are shown in greater detail in FIG. 9B, which provides a cross-sectional view of mold body 5 along line 2B as denoted in FIG. 9A. Mold body 5 also includes injection cavity 2, as discussed in detail above. The embodiment of mold body 5 shown in FIGS. 9A-9B is comprised of a solid, non-metal material, such as a dissolvable, castable, or removable polymeric material or a wax blend, with the material spanning from first longitudinal surface 60 to second longitudinal surface 61, and from first lateral surface 62 to second lateral surface 63. As such, mold body 5 does not include a polymeric shell, as shown in FIG. 8 and described above, and instead includes a solid filler material. This solid material is shown in greater detail in FIG. 10, and may be referred to as non-metal layer 65.

Figure 9B:
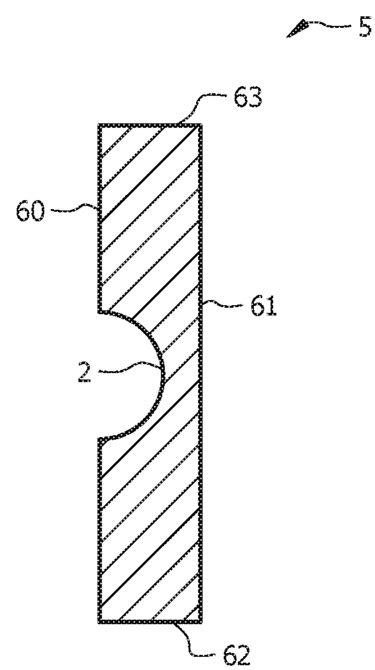
FIG. 9B is a cross-sectional view of the uncoated mold of FIG. 9A.
Figure 10:
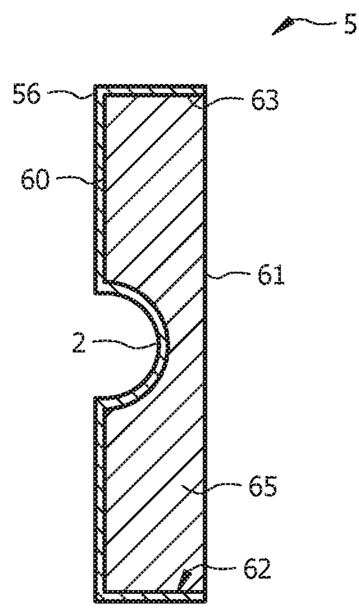
FIG. 10 is a cross-sectional view of the mold of FIG. 9A including a coating disposed on a layer thereof.

FIG. 10 depicts mold body 5 from FIGS. 9A-9B, including metallic coating 56, which is disposed on an exterior surface of mold body 5 and may coat injection cavity 2, and including non-metal layer 65. Metallic coating 56 is added to mold body 5 via a plating process, such as an electroless plating method, producing an even, conformal coating on first longitudinal surface 60, first lateral surface 62, and second lateral surface 63 of mold body 5. Importantly, second longitudinal surface 61 of mold body 5 is not coated with metallic coating 56, as will be discussed in greater detail below. Plating methods other than electroless plating methods may be used, such as electro plating, physical vapor deposition (PVD), metallic binder spraying, or carbon binder spraying. The metal or combination of metals comprising metallic coating 56 is preferable thick enough to be self-supporting under gravity, as well as receive and retain a poured metallic layer without melting or collapsing. In an embodiment, the thickness of metallic coating 56 is between 200 and 1,000 microns.

Figure 11:
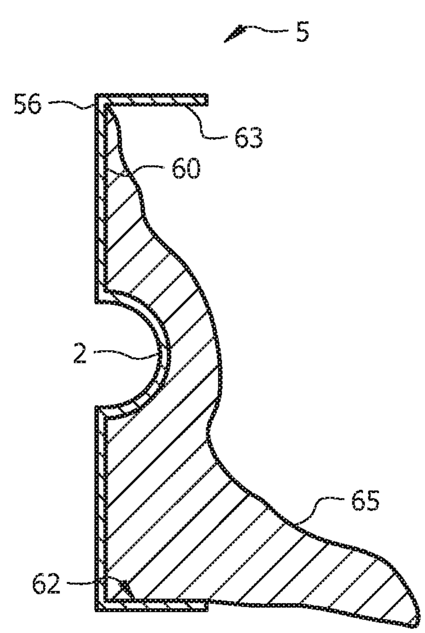
FIG. 11 is a cross-sectional view of the coated mold of FIG. 10, showing the removal of the material of the mold beneath the coating.

FIG. 11 depicts an intermediary stage of creating a final mold body 5. As shown in FIG. 11, non-metal layer 65 is removed from mold body 5, which can be accomplished by heating mold body 5 until non-metal layer 65 melts or outgasses from mold body 5. By removing non-metal layer 65 from mold body 5, mold body 5 becomes a metallic shell formed of metallic coating 56, including first longitudinal surface 60, first lateral surface 62, and second lateral surface 63. Because second longitudinal surface 61 is not coated with metallic coating 56, second longitudinal surface 61 remains non-metallic (i.e., polymeric, wax-based, or another solid, non-metallic material of which non-metal layer 65 is formed), and second longitudinal surface 61 is removed from mold body 5 when non-metal layer 65 is removed from mold body 5.

Figure 12:
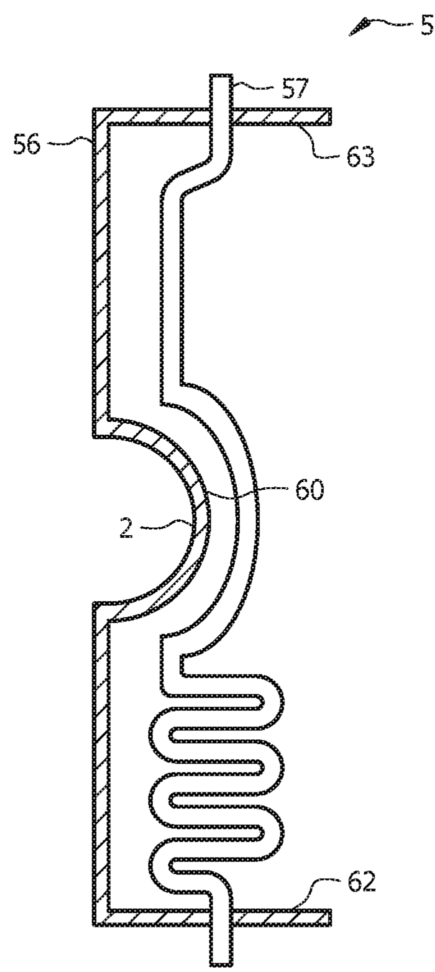
FIG. 12 is a cross-sectional view of the coated mold of FIG. 11, with the mold material removed, including a cooling line spanning from one side of the mold to an opposing side of the mold.

FIG. 12 depicts an addition of cooling channel 57 to mold body 5, similar to the embodiment of cooling channel 57 shown in FIG. 8 and discussed in detail above. To add cooling channel 57 to mold body 5, holes may be formed within first lateral surface 62 and second lateral surface 63, thereby allowing cooling channel 57 to be disposed within mold body 5 and remain in communication with an environment exterior to mold body 5 to exhaust heat from mold body 5. One or more cooling channels 57 may be disposed within mold body 5, depending on the heating requirements of mold body 5, and depending on the size of mold body 5.

Figure 13:
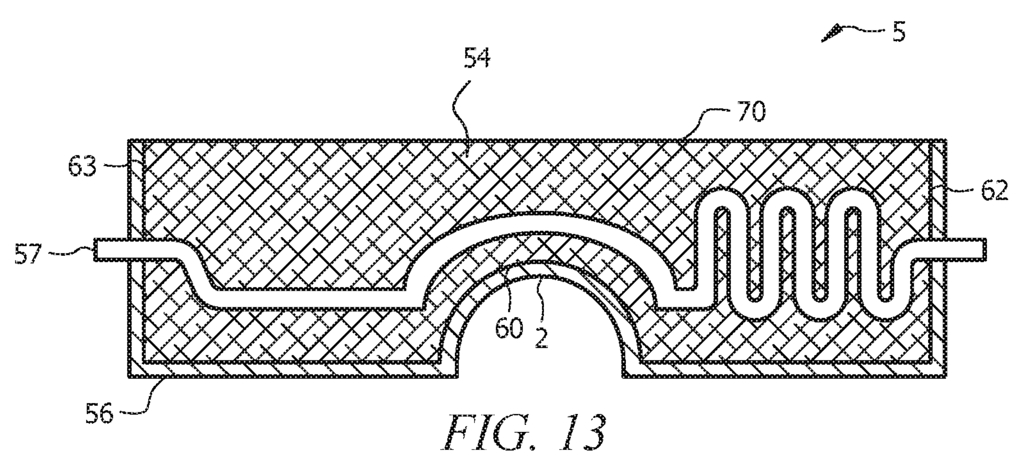
FIG. 13 is a cross-sectional view of the coated mold of FIG. 12 including the cooling line, further including a solidified filler material to recreate the mold body beneath the cavity.

FIG. 13 shows a finalized mold body 5 in accordance with an embodiment of the present invention. After cooling channel 57 is disposed within mold body 5, metallic layer 54 is poured into mold body 5, specifically the shell formed by metallic coating 56 which coats first longitudinal surface 60, first lateral surface 62, and second lateral surface 63 of mold body 5. Metallic layer 54 is poured into mold body 5 in a liquid form, such that metallic layer 54 conforms to the shape of the shell defined by metallic coating 56 to solidify therein. After solidifying, metallic layer 54 forms a new metallic bottom surface 70, thereby replacing the non-metallic second longitudinal surface 61 which is previously removed from mold body 5 (as shown in FIG. 11). Similarly, metallic layer 54 solidifies around cooling channel 57 to retain cooling channel 57 in place, thereby preventing the relative translation of cooling channel 57 with respect to mold body 5.

Metallic layer 54 is preferably formed of one or more metals having a high melting temperature, such as aluminum, copper, iron, steel, combinations thereof, and other similar metals with high melting temperatures. The finalized mold body 5 as shown in FIG. 13 is composed entirely of metal, without any polymeric material to act as a thermally-resistive barrier within mold body 5. Mold body 5 can undergo further post-processing steps, such as heat treatment, carburization, nitridization, and the like. After cooling, mold body 5 can be used on its own to produce molded objects within injection cavity 2, or mold body 5 can alternatively be inserted within a separate housing to produce molded objects, depending on the printing requirements of the system used in combination with mold body 5.

Glossary of Terms

About: as used herein, means approximately or nearly and in the context of a numerical value or range set forth means about ±15 percent of the numerical.

Coating: is a layer of material less than 0.13 mm (0.005 in) in thickness, that is disposed on a surface of a mold body, that can protect the material defining the mold cavity, reduce friction between a molded part and a mold cavity wall to enhance removal of the molded part from the mold cavity, absorb heat energy, or define a shape of a mold cavity.

Cooling channel: is a pathway through which heat can be removed from a mold body, such as by being exhausted into an exterior environment outside of the mold body.

High pressure: as used herein, means pressures at or above 100 PSI.

Injection channel: is a pathway through which materials can be injected.

Low pressure: as used herein, means pressures below 100 PSI.

Rib: is a layer of material coupled to or formed on a structure that increases the stiffness and thermal conductivity of the structure.

Thermal conductivity: as used herein, means a capability to transfer heat.

Useful life: is the expected life of a mold before failure or scheduled replacement. When used in conjunction with a mold (or any part of the mold that defines the mold cavity), the term "useful life" means the time a mold is expected to be in service before quality problems develop in the mold, or before mechanical failure (e.g., fatigue failure or fatigue cracks) occurs in the mold.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

What is claimed is:

1. An injection mold comprising:

a mold body including an exterior wall and an interior wall having an outward-facing surface, the interior wall defining an injection cavity, the interior wall having an inward-facing surface opposite the outward-facing surface;

a first longitudinal surface disposed adjacent to the inward-facing surface of the interior wall, such that the inward-facing surface of the interior wall is disposed between the first longitudinal surface and the outward-facing surface of the interior wall, the first longitudinal surface spanning between a first lateral surface opposite a second lateral surface, an interior side of the first longitudinal surface, first lateral surface, and second lateral surface defining an interior shell;

a thermally conductive cooling channel at least partially disposed within the interior shell and in communication with an environment exterior to the mold body, the thermally conductive cooling channel adapted to remove heat energy from the mold body to the environment exterior to the mold body;

a metallic layer disposed within and filling a volume of the interior shell, the metallic layer spanning from the first longitudinal surface along each of the first lateral surface and the second lateral surface, the metallic layer surrounding the thermally conductive cooling channel and forming a second longitudinal surface opposite the first longitudinal surface;

a thermally conductive layer disposed on the outward-facing surface of the interior wall; and a mold release layer disposed on the thermally conductive layer, such that the thermally conductive laver is disposed between the mold release layer and the outward-facing surface of the interior wall, wherein the thermally conductive layer and the mold release layer are configured to facilitate a removal of molded component created via the mold body.

2. The injection mold of claim 1, wherein the thermally conductive cooling channel is disposed to receive a cooling fluid, the cooling fluid configured to interact with the mold body to improve thermal conductivity of the mold body by removing heat energy from the mold body.

3. The injection mold of claim 1, wherein the metallic layer is adapted to conform to a shape of the interior shell in a liquid form and solidify between the first longitudinal surface, first lateral surface, and second lateral surface.

4. The injection mold of claim 1, further comprising a metallic coating disposed on an exterior side of the first longitudinal surface, such that the metallic coating is disposed between the first longitudinal surface and the inward-facing surface of the interior wall of the mold body.

5. The injection mold of claim 4, wherein the metallic coating has a thickness of between 200 and 1,000 microns, such that the metallic coating is adapted to be self-supporting under gravity.

6. The injection mold of claim 1, further comprising a metallic coating disposed on an exterior side of the first longitudinal surface, an exterior side of the first lateral surface, and an exterior side of the second lateral surface, such that the metallic coating is disposed between the first longitudinal surface and the inward-facing surface of the interior wall of the mold body.

7. The injection mold of claim 6, wherein the metallic coating has a thickness of between 200 and 1,000 microns, such that the metallic coating is adapted to be self-supporting under gravity.

8. The injection mold of claim 1, wherein the mold body is formed of a polymeric material, wherein the metallic layer disposed within the interior shell is formed of a metal having a low melting temperature selected from the group consisting of indium, tin, gallium, zinc, alloys copper, alloys of silver, alloys of gold, and combinations thereof.

9. The injection mold of claim 1, wherein the mold body is formed of a metallic material, wherein the metallic layer disposed within the interior shell is formed of a metal having a high melting temperature selected from the group consisting of aluminum, copper, iron, steel, and combinations thereof.

* * * * *

UNITED STATES PATENT AND TRADEMARK OFFICE

CERTIFICATE OF CORRECTION

PATENT NO. : 11,034,069 B2
APPLICATION NO. : 16/406691
DATED : June 15, 2021
INVENTOR(S) : Stephen P. Stagon and Tuan Tran It is certified that error appears in the above-identified patent and that said Letters Patent is hereby corrected as shown below:

In the Claims

Column 12, Claim 1, Line 39 should read:
layer, such that the thermally conductive layer is dis- Column 12, Claim 1, Line 44 should read:
a molded component created via the mold body.

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*